United States Patent [19]

Long

[11] Patent Number: 4,476,588
[45] Date of Patent: Oct. 16, 1984

[54] HAND CARE GLOVE PRODUCT AND METHOD OF MAKING SAME

[76] Inventor: Daniel C. Long, 14314 Hamilton, Riverview, Mich. 48192

[21] Appl. No.: 399,324

[22] Filed: Jul. 19, 1982

[51] Int. Cl.³ .............................................. A41D 19/02
[52] U.S. Cl. .......................................... 2/169; 2/167; 2/159; 604/292
[58] Field of Search ............... 2/159, 167, 243 B, 169; 604/292, 293

[56] References Cited

U.S. PATENT DOCUMENTS

| | | | |
|---|---|---|---|
| 2,526,634 | 10/1950 | Chavannes | 2/167 X |
| 3,347,233 | 10/1967 | Migliarese | 604/292 |
| 3,384,083 | 5/1968 | Cozza et al. | 2/167 X |
| 3,866,245 | 2/1975 | Sutherland | 2/159 X |
| 3,920,500 | 11/1975 | Brieske | 2/169 X |
| 4,034,853 | 7/1977 | Smith | 2/169 X |
| 4,051,572 | 10/1977 | Greenwood | 2/159 X |
| 4,185,330 | 1/1980 | Stager | 2/167 X |

FOREIGN PATENT DOCUMENTS 2448746  4/1976  Fed. Rep. of Germany .......... 2/167

*Primary Examiner*—Werner H. Schroeder
*Assistant Examiner*—Tracy-Gene Graveline
*Attorney, Agent, or Firm*—Harness, Dickey & Pierce

[57] ABSTRACT

A disposable hand care product comprising first and second glove side elements fabricated of a relatively thin plastic film material, each of these elements having oppositely extending finger receiving areas and juxtapositioned palm receiving areas, these side elements being disposed in face-to-face aligned relationship and being sealingly interconnected to one another around the entire periphery thereof so as to define a pair of glove members arranged in wrist-to-wrist connected relationship, a hand care product disposed interjacent these side elements, and separating means permitting convenient separation of the pair of glove members from one another and simultaneously providing access into the interior of the member so that a person can insert his or her hands into these members and thereby have skin contact with the hand care product disposed therewithin.

17 Claims, 8 Drawing Figures

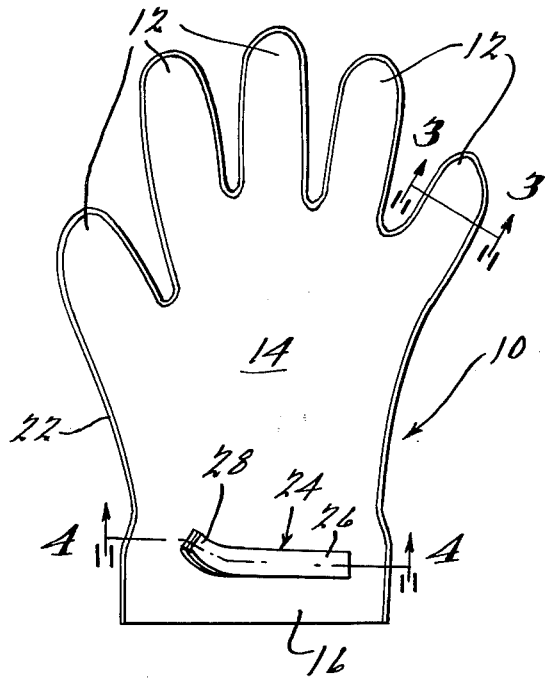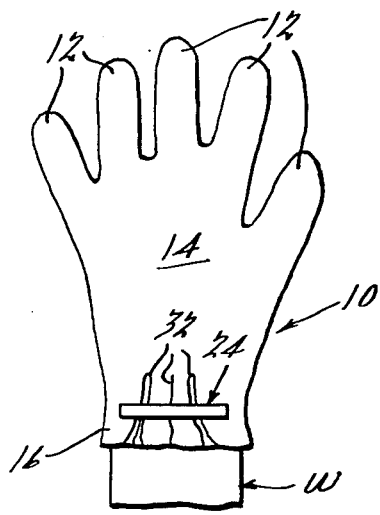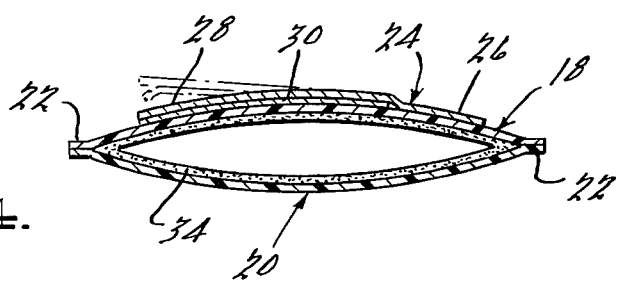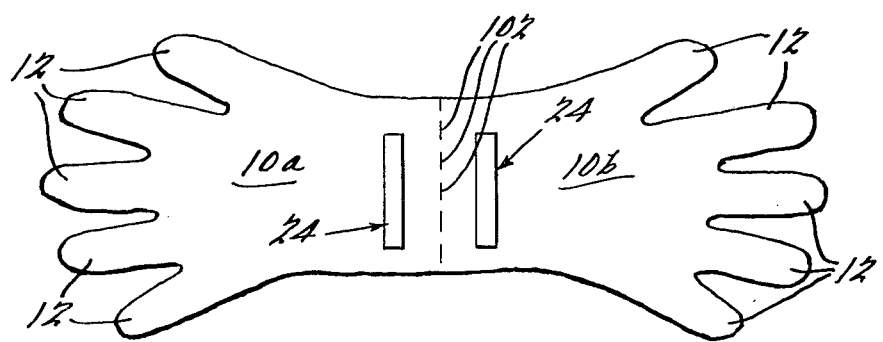

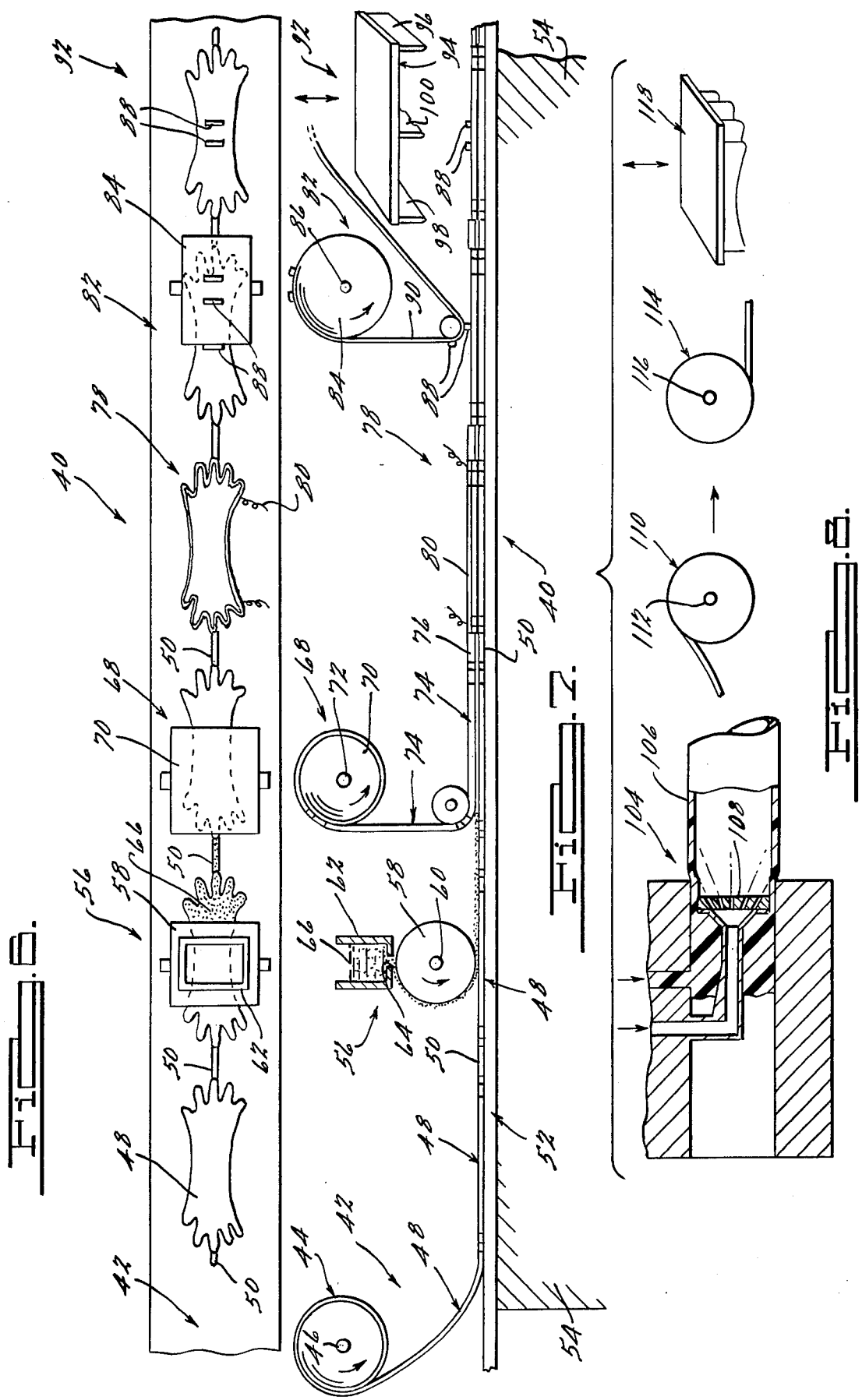

HAND CARE GLOVE PRODUCT AND METHOD OF MAKING SAME

BACKGROUND AND OBJECT OF THE INVENTION

It is well recognized that the skin of the hands may be maintained in a soft, pliable condition by applying creams, lotions, etc., of various kinds, and it is customary in order for a person to maintain his or her hands in such a soft, pliable condition to devote significant time to the application of hand care materials when and if such time is available. It is very frequently the case, however, that the person who desires to subject his or her hands to such treatment does not have an adequate amount of time during which to carry out the lotion applying operation, in which case the person may frequently, out of necessity, not have the soothing benefit of such lotions. It is, therefore, one of the principle purposes of the present invention to provide means whereby any person who desires to do so may treat his or her hands with a hand care material, such as a cream or a lotion, for any length of time as may be necessary to achieve a desired result, and with specifically appropriating this time exclusively to specific lotion application.

The aforesaid is accomplished in accordance with the present invention through the use of a new and improved hand care glove product consisting of disposable gloves fabricated of a thin plastic film material which has a hand care material disposed interiorly thereof, whereby when the person wears the gloves, the person's hands receive the beneficial effect of the lotion, cream, etc. After a person has completed using the gloves, by virtue of their economical construction, they may be discarded or disposed of without any significant monetary loss. In accordance with the present invention, the glove product may be worn at night so that the soothing effect of the lotion disposed therewithin will be achieved throughout the night; or alternatively, the glove product may be worn during daylight hours and while the wearer is at work, perhaps, while the wearer is doing housework, or other tasks which might necessitate the use of gloves to protect the hands from becoming soiled or from harsh cleaning substances, abrasives, etc. In either case the thin plastic film material from which the glove product of the present invention is fabricated protects the wearer's hands and at the same time, prevents the outward escape of the lotion or cream contained therewithin.

In accordance with one of the features of the present invention, the particular hand care material which is provided interiorly thereof may be medicinal in character so as to be effective in healing a localized skin infection or other skin diseases of the hands where, if subject to proper medication in a locally applied manner and protected from the environment and exposure to harsh outside conditions, the skin disease may be rapidly cured.

It is, therefore, a general object of the present invention to provide a new and improved glove product.

It is a more particular object of the present invention to provide a new and improved glove product that is manufactured of a thin plastic-like material and is provided with a hand care lotion, cream, or the like, interiorly thereof and which may be discarded or disposed of after use.

It is yet a more particular object of the present invention to provide a new and improved glove product of the above-described type wherein associated pairs of gloves are fabricated simultaneously and are integrally connected prior to use. At such time as use is desired, the associated gloves are separated along the perforated area which effects separation of the gloves and provides access into the interior thereof so that a person may insert his or her hands thereinto.

It is another object of the present invention to provide a hand care glove product of the above-described type which includes means for positively retaining the glove product on the wearer's hands, which means includes adhesive tape-like elements that are used to gather the excess glove material at the wrist portion of the glove and thereby secure the gloves in place.

It is yet another object of the present invention to provide a new and improved hand care glove product, as above described, wherein the associated gloves of each integrally fabricated pair thereof are interchangeable for left and right hands.

It is still another object of the present invention to provide a new and improved hand care glove product of the above-described type which is extremely lightweight and yet is sufficiently durable to permit a person to perform manual jobs without inadvertently tearing or otherwise affecting the structural integrity of the glove products.

It is a further object of the invention to provide a new and improve hand care glove product of the above-described type which can be used by the wearer during either the day or night.

It is still a further object of the present invention to provide a new and improved method of manufacturing a hand care glove product and wherein the particular hand care lotion, cream, etc., disposed within may be medicated.

Other objects and advantages of the present invention will become apparent from the following detailed description taken in conjunction with the accompanying drawings.

BRIEF DESCRIPTION OF THE DRAWINGS

FIG. 1 is a top elevational view of a glove product incorporating the principles of the present invention;

FIG. 2 is a view of the glove product of the present invention similar to FIG. 1, with the associated securing means thereof disposed in a "fastened" position;

FIG. 3 is a transverse cross-sectional view taken substantially along the line 3—3 of FIG. 1;

FIG. 4 is a transverse cross-sectional view taken substantially along the line 4—4 of FIG. 1;

FIG. 5 is a top elevational view of the present invention and illustrates how a pair of glove products are fabricated in an integral, wrist-to-wrist orientation prior to separation thereof which occurs at the time of use;

FIG. 6 is a top elevational view of a schematic representation of a manufacturing facility for manufacturing the glove products of the present invention and practicing the fabricating methods thereof;

FIG. 7 is a side elevational view of the manufacturing facility disclosed in FIG. 6, and FIG. 8 is a schematic representation of an alternate method of manufacturing the glove producte of the present invention.

DESCRIPTION OF THE PREFERRED EMBODIMENTS

Referring now in detail to the drawings, and particularly to FIG. 1 thereof, a glove product in accordance with one preferred embodiment of the present invention, and produced in accordance with the method of the present invention, is shown as comprising a plurality of five finger sections 12 and a palm section 14. Disposed at the opposite end of the palm section 14 from the finger sections 12 is a wrist section 16 which is adapted to be juxtapositioned the wrist W of a wearer once his hand is inserted into the glove 10 in a normal operative manner, as is shown in FIG. 2, whereby the palm of the wearer is juxtapositioned the palm section 14 of the glove 10 and each of the wearer's associated fingers is removably received in one of the finger sections 12, as is well known in the art.

The glove 10 comprises upper and lower side members 18 and 20, respectively, which are identical in shape and are fabricated of a thin plastic film-like material, such as polyethylene. The upper and lower side members 18, 20 are adapted to be fixably secured to one another by means of a heat sealing operation, as indicated at 22, which extends around the entire peripheral area of the glove 10, with the exception of the wrist section 16 thereof. Means for detachably securing the glove on the wearer's hand is provided by a tape-like strap 24 having one end portion 26 thereof fixably secured to the upper side member 18, with an adhesive material 28 being provided on the opposite end of the member 24. A removable paper backing material 30 (see FIG. 4) is provided on the adhesive material 28 and is intended to be removably disposed thereon whereby said backing material 30 may be removed and the tape 24 may be tensioned to gather together the excess material of the upper glove member 18 to a folded or creased configuration, as seen at 32 in FIG. 2, whereupon the adhesive end portion of the tape 24 may be applied directly to the upper surface of the glove member 18, thereby positively securing the glove 10 in a tightened fashion upon the hand of the wearer.

In accordance with the principles of the present invention, the interior of the glove 10 is intended to be provided with a hand care material, such as any one of a variety of types of hand lotions, creams, oils or the like, for soothing, strengthening, and generally beautifying the skin of a person's hand. Such lotions, creams, oils or the like may be provided with medicinal additives, such as hydracortisone, or the like, or various other types of unguent materials which have a smoothing, salving or softening affect upon the wearer's hands, such as various vegetable or animal oils; for example, lanolin derivatives or the like. Preferably the lotion or material, representatively designated by the numeral 34 in the drawings, is dispersed within the entire interior surface of the glove 10 and covers the interior surface of both the upper and lower glove side members 18 and 20, as best shown in FIGS. 3 and 4.

In accordance with another principle of the present invention, the glove 10 depicted in FIGS. 1 and 2 is intended to be one of a pair of such gloves 10 which are, during the manufacturing operation, fabricated so as to be integrally connected to one another, as is representatively indicated in FIG. 5 by the gloves 10a and 10b. Toward this end, the gloves 10a and 10b are adapted to be integrally connected at the respective wrist portions 16 thereof and at such time as it is desired to use the gloves, the same would be separated at a tear line or perforated portion designated by the numeral 102, which permits the two gloves 10a and 10b to be torn apart in an effortless manner and thereby separate the. same and simultaneously provide access into the interior of the gloves 10a and 10b so that the same may be placed upon the wearer's hands.

Referring now in detail to the one preferred method of fabricating the glove product 10 of the present invention, as shown in FIG. 6 and 7, a manufacturing facility or production line, representatively designated by the numeral 40, is shown as comprising a first station 42 consisting of a roller 44 mounted for rotation upon a generally horizontal axis 46 and having provided thereon a continuous roll of wrist-to-wrist connected pairs of lower glove sides 48 which are interconnected by tabs 50. The roller 44 is intended to rotate in a counterclockwise direction in FIG. 7, whereupon the continuous line of glove sides 48 will traverse from left to right in FIG. 7 along a production conveyor, generally represented by the numeral 52, and supported in any suitable fashion upon a suitable support structure 54. Disposed directly to the right of the first station 42 in FIG. 7 is a second station, generally designated by the numeral 56. The second station 56 comprises a lotion applying roller 58 which is mounted for rotation about a generally horizontal axis 60 and is located directly below a lotion reservoir 62 having a dispensing opening 64 through which lotion or other suitable hand care material is dispensed upon the periphery of the roller. As shown in FIG. 7, the roller 58 is disposed directly above the conveyor 52 is thereby adpated to deposit lotion on the periphery thereof directly upon the upper surface of the continuous line of lower glove sides 48. Disposed directly to the right of the second station 56 is a third station, generally designated by the numeral 68, and comprising a roller 70 that is mounted for rotation upon a generally horizontally disposed axis 72. Disposed upon the roller 70 is a continuous roll or line of wrist-to-wrist connected pairs of upper glove sides 74, which sides 74 are interconnected by tabs 74 adapted to be unrolled or transferred, upon counterclockwise rotation of the roller 70, onto the upper sides of the lower glove sides 48, with the roller 70 being properly synchronized with the roller 44 such that the upper and lower glove sides 74, 78 are superimposed upon one another; i.e., disposed in vertical alignment. Disposed directly to the right of the third station 68 is a fourth station 78 which comprises a heat seal apparatus, generally designated by the numeral 80. Typically, the apparatus 80 comprises a heating element which is in the form of the outer periphery of the wrist-to-wrist connected pairs of glove sides 48, 74 and is mounted for vertical reciprocating movement, whereupon when each vertically aligned sets of glove sides 48, 74 move into vertical registry with the apparatus 80, the same moves downwardly toward the upper surface of the conveyor 52 to effect a continuous heat seal around the entire outer periphery of the vertically aligned sets of glove sides 48, 74.

After the glove sides 48, 74 are thus sealingly interconnected with the lotion or similar material 66 disposed interiorly thereof, the entire line of interconnected glove assemblies continue to move from left to right in FIG. 6 and 7 to a position wherein they move to a fifth station, generally designated by the numeral 82, and comprising a roller 84 rotatable upon a horizontal axis 86 and adapted to be provided with a series of tapes or straps 88 which are identical in construction to the aforementioned tapes 24 shown in FIGS. 1 through 5. At the fifth station 82, said tapes 88 are selectively surmounted upon the upper surfaces of the upper glove side members 74. Typically, the tapes 88 may be carried upon a carrier belt 90 which moves into juxtaposition with the continuous roll of glove members so that the tapes 88 can be transferred therefrom onto the glove members, whereupon the carrier belt 90 is resupplied with additional tapes 88 for subsequent application to later fabricated glove assemblies.

After the glove assemblies consisting of the upper and lower glove side members 48 and 74 and tapes 88 move through the fifth station 82, they move to a final separating station 92 wherein each assembled wrist-to-wrist pair of gloves is separated from the immediately adjacent pair thereof by severing the tabs 50, 76 which is accomplished through operation, for example, of suitable severing knives or blades 96, 98; in addition. the perforated line 102 shown in FIG. 5 may be formed at the wrist sections of each integrally connected pair of glove members which functions to provide an area of weakness which the integrally connected pairs of gloves may be subsequently separated to provide for use thereof. The thus separated pairs of wrist-to-wrist connected glove assemblies may then move to a subsequent packaging operation where the same are packaged in any suitable manner preparatory to subsequent marketing, as will be appreciated by those skilled in the art.

FIG. 8 illustrates a slightly modified embodiment of the method of fabricating the glove product of the present invention wherein the upper and lower glove sides are formed originally from a tubular extrusion of polyethylene or similar plastic film material. More specifically, the apparatus shown in FIG. 8 utilizes tubular film extruder 104 which is intended to extrude a tubular film 106 of plastic film material. Disposed at the outlet end of the film extruder is a suitable source of lotion, such as a lotion spray dispenser 108, which sprays or otherwise injects a layer of lotion or other suitable hand care material interiorly of the tube as it is being extruded from the apparatus 104. The tubular material having the lotion disposed therewithin is thereafter rolled upon a take-up roll 110 mounted for rotation upon an axis 112 where the plastic material may be temporarily stored prior to fabrication or prior to being transferred to a suitable feed roll 114 mounted for rotation upon an axis 116 wherein the flattened film material may be selectively fed to a combination die-cutting and heat sealing tool 118 which functions to selectively die stamp the pair of integrally connected glove products and peripherally seal the same in a manner similar to that hereinabove described.

It will be seen from the foregoing that the present invention provides a novel and economical glove product and method for fabricating the same that will achieve highly desired and beneficial hand care. By virtue of the fact that the glove product of the present invention may be economically manufactured of a thin plastic film material, the glove product may be utilized for its intended purpose and then be totally discarded without economic hardships. Additionally, by virtue of the fact that the lotion material is totally sealed within the integrally connected pairs of gloves, the material is left unaffected by the environment during storage and at such time as use of the gloves is desired, the pair of integrally connected gloves may be simply separated by tearing the perforated area between the wrist sections thereof, which results in access to the interior of the respective pairs of gloves for convenient wearing thereof.

While it will be apparent that the preferred embodiments of the invention disclosed is well calculated to fulfill the objects above stated, it will be appreciated that the invention is susceptible to modification variation and change without departing from the proper scope or fair meaning of the subjoined claims.

I claim:

1. A disposable hand care glove product comprising, first and second glove side elements fabricated of a relatively thin plastic film material,
   each of said elements having oppositely extending finger receiving areas and juxtapositioned palm receiving areas,
   said side elements being disposed in face-to-face aligned relationship and being sealingly interconnected to one another around the entire periphery thereof so as to define a pair of glove members arranged in wrist-to-wrist connected relationship,
   a hand care product disposed interjacent said side elements, and
   separating means permitting convenient separation of said pair of glove members from one another and simultaneously providing access into the interior of said member so that a person's hands can be inserted into said members and thereby have skin contact with said hand care product disposed therewithin,
   said product being produced by the method of:
   providing a continuous supply of said first glove product side element,
   applying said hand care product to one side of said first glove product side element,
   providing a continuous supply of said second glove product side element,
   aligning the first and second side elements and arranging said side elements in face-to-face relationship, and
   sealingly interconnecting the first and second elements of said glove product around the entire periphery thereof so that said hand care product is self-contained therein.

2. The invention as set forth in claim 1 wherein said first and second glove side elements are identical in shape.

3. The invention as set forth in claim 1 wherein said pair of glove members may be interchangeably placed on either hand of a wearer.

4. The invention as set forth in claim 1 wherein said glove side elements are sealingly interconnected to one another by heat seal means.

5. The invention as set forth in claim 1 wherein said hand care product is uniformly distributed over the entire area of said glove side elements.

6. The invention as set forth in claim 1 wherein said separating means comprises a perforated portion of said glove side elements.

7. The invention as set forth in claim 6 wherein said perforated area is disposed equal distance from the opposite ends of said glove side elements.

8. The invention as set forth in claim 7 wherein said perforated area permits manual tearing of said product to separate the same into said glove members.

9. The invention as set forth in claim 1 which includes securing means for detachably securing said glove members on the hands of a wearer thereof.

10. The invention as set forth in claim 9 where said securing means comprises adhesive tape-like means.

11. The method of producing a disposable hand care glove product comprising first and second interconnected glove side elements each consisting of interconnected but separable glove portions and fabricated of a relatively thin plastic film material and having a hand care product therewithin, the steps include,
- providing a continuous supply of the first glove product side element,
- applying a hand care product to one side of said first glove product side element,
- providing a continuous supply of the second glove product side element,
- successively aligning the first and second side elements and arranging said side elements in face-to-face relationship,
- sealingly interconnecting the first and second elements of said glove product around the entire periphery thereof.

12. The method as set forth in claim 11 which includes the step of providing at least one of the glove product side elements from a roll thereof.

13. The method as set forth in claim 11 which includes the step of providing both of said glove product side elements from separate rolls thereof.

14. The method as set forth in claim 11 which comprises the step of sealingly interconnecting the first and second glove product side elements by heat seal means.

15. The method as set forth in claim 11 which includes the additional step of producing the glove products in end-to-end continuous relationship and severing separate products upon completion of the sealingly and interconnecting step.

16. The method as set forth in claim 11 which comprises the additional step of providing separating means on each glove care product, whereby the product may be conveniently manually separated into individual gloves.

17. The method as set forth in claim 11 wherein each of said products comprises hand receiving areas and juxtaposed palm receiving areas and wherein said separating means is disposed interjacent said palm receiving areas of said products.

* * * * *

UNITED STATES PATENT AND TRADEMARK OFFICE
CERTIFICATE OF CORRECTION

PATENT NO. : 4,476,588
DATED     : October 16, 1984
INVENTOR(S) : Daniel C. Long It is certified that error appears in the above-identified patent and that said Letters Patent is hereby corrected as shown below:

Column 1, line 24, "with" should be --without--.

Column 2, line 32, "improve" should be --improved--.

Column 2, line 67, "producte" should be --products--.

Column 3, line 47, "strengthing" should be --strengthening--.

Column 3, line 52, "affect" should be --effect--.

Column 4, line 32, "adpated" should be --adapted--.

Column 4, line 46, "78" should be --48--.

Column 5, line 19, "." should be --,--.

Column 8, line 22, "juxtaposed" should be --juxtapositioned--.

Signed and Sealed this

Twenty-ninth Day of October 1985

[SEAL]

Attest:

DONALD J. QUIGG

Attesting Officer

Commissioner of Patents and Trademarks—Designate